United States Patent [19]
Suarez et al.

[11] Patent Number: 5,867,378
[45] Date of Patent: Feb. 2, 1999

[54] AC/DC POWER CONVERTER DEVICE

[75] Inventors: Oscar Garcia Suarez; José Antonio Cobos Marquez; Javier Uceda Antolin; Salvador Ollero Velasco; Enrique De La Cruz Moreno, all of Madrid, Spain

[73] Assignee: Alcatel Alsthom, Paris, France

[21] Appl. No.: 871,049

[22] Filed: Jun. 9, 1997

[30] Foreign Application Priority Data

Jun. 20, 1996 [ES] Spain ................................. P9601382

[51] Int. Cl.⁶ ...................................................... H02M 7/06
[52] U.S. Cl. ............................................. 363/65; 363/125
[58] Field of Search ................................. 363/16, 37, 62, 363/65, 101, 125

[56] References Cited

U.S. PATENT DOCUMENTS

| | | | |
|---|---|---|---|
| 5,404,092 | 4/1995 | Gegner | 363/65 |
| 5,627,455 | 5/1997 | Jacobs et al. | 323/222 |
| 5,689,410 | 11/1997 | Jiang | 363/56 |

OTHER PUBLICATIONS

"A Novel Single–Phase Power Factor Correction Scheme", Y. Jiang et al, Proceedings of the Eighth Annual Applied Power Electronics Conference (APEC '93), May 7–11, 1993, San Diego CA, pp. 287–292.

*Primary Examiner*—Robert E. Nappi
*Assistant Examiner*—Y. J. Han
*Attorney, Agent, or Firm*—Ware, Fressola, Van Der Sluys & Adolphson LLP

[57] ABSTRACT

AC/DC power converter device comprising a full-wave rectifier (R) the output of which is applied to a direct current module which has two outputs: the main output is connected to the load via a capacitor (C1) which transfers a first power level (P1), and the auxiliary output is formed by a capacitor (C2) and a direct current converter (DC) which stores a second power (P2) and transfers it to the load during the full cycle of the input power wave (PE). As a result the second power level (P2) is continuously topping up the first power level (P1).

1 Claim, 2 Drawing Sheets

AC/DC POWER CONVERTER DEVICE

BACKGROUND OF THE INVENTION

1. Technical Field of the Invention

Compliance with the standard IEC 555-2 (IEC 1000-3-2) by AC/DC converters requires the latter to reduce the injection of harmonics into the AC mains supply which otherwise impair its quality. Consequently there exists a concern among designers of AC/DC converters to improve the power factor correction of the converter in order to suppress the harmonics which these devices inject into the AC mains supply.

The AC/DC power converter device of the invention corrects the power factor and is of special, but not exclusive, application in communications systems in which high efficiency converters are required which are light in weight, small in size and inexpensive.

2. Description of Related Art

To satisfy the content of the standards currently in force, AC/DC converters with power factor correction are based on power flow analysis.

This technique for AC/DC converter design is known, for example, from the article "A NOVEL SINGLE-PHASE POWER FACTOR CORRECTION SCHEME", by Yimin Jiang, Fred C. Lee, Guichao Hua and Wei Tang, Proceedings of the Eighth Annual Applied Power Electronics Conference (APEC'93), Mar. 7–11, 1993, San Diego, California, U.S.A., pages 287 to 292.

In this article it is shown that, in parallel with the path followed by the main power flow, there is another power flow that is transferred to the load through what is termed the power factor correction circuit, in such a manner that the correcting circuit does not process all the power that is transferred to the load.

Consequently, there is a part of the input power, representing about the 68% of the average input power, that is transferred directly to the converter output and which is therefore only processed once; the rest of the input power, representing about the 32% of the input power, is processed twice by the power factor correction circuit.

In other words, the power factor correction circuit only transfers power to the output when the input power is less than the average value of the output power, assuming the input power to be a sine squared function. Likewise, when the input power is greater than the output power, the excess energy is stored in the power factor correction circuit, specifically in its capacitor.

Thus the main power flow is transferred directly to the load through a full-wave bridge booster converter and the power factor correction circuit, which transfers the stored power to the load, is formed by a capacitor and a forward converter.

The problem with this technique lies in the control of the switching elements in the full-wave bridge booster converter, since it must distinguish between the periods when the power level is greater than or less than the average value of the output power. Consequently the switching control signals for the switching elements take different values in each cycle.

So, the objective is to achieve an AC/DC converter designed around a simple topology, with few components and simple switching control, and which provides a high power factor and a high efficiency.

SUMMARY OF THE INVENTION

The AC/DC power converter device of the invention is formed by a full-wave rectifier which is connected to the AC mains supply and produces a rectified sine wave which is applied to the input of a direct current module which has two outputs and whose topology permits a power factor close to unity to be reached.

The input power, which has a sine squared waveform, is split by the direct current module between two outputs which conserve the input power waveform.

The main output directly transfers part of the input power to the load during the whole cycle, while the auxiliary output stores the other part of the power in a capacitor which is connected to the load through a direct current module (DC), such as a DC/DC converter.

The energy stored is released into the load both during the period when the input power is greater than and when it is less than the average value of the output power. Thus, the direct current module takes the other part of the power stored in the capacitor and delivers it as additional power required by the load. It can be seen that the first power plus the power delivered by the direct current module is equal to the output power. As a result, during the entire cycle of the input power wave, the auxiliary output is topping up the power delivered by the main output to the load.

Consequently, with no need to distinguish between the periods when the input power is greater than or less than the average value of the output power, the AC/DC power converter device is simpler and therefore switching control is also more simple.

It will thus be seen that the present invention is characterized in that the direct current module (DC) takes the second power (P2) stored in the capacitor (C2) and adds it to the first power (P1) thereby compensating the difference between an average value of the output power (P0) and the first power (P1) for the whole cycle of the input power waveform (PE) since the first power (P1) is less than the average value of the output power (P0).

The present invention allows a drastic reduction in the size of the output capacitor as well as the size of the entire converter. The proposed energy management process reduces the loss of energy through conduction, improving the total efficiency of the converter. Furthermore, the proposed embodiments have simple power stages which provide simple control.

The AC/DC power converter device offers a high efficiency, is smaller in size and of less weight, and is cheaper.

These and other objects, features and advantages of the present invention will become more apparent in light of the detailed description of a best mode embodiment thereof, as illustrated in the accompanying drawing.

BRIEF DESCRIPTION OF THE DRAWING

A fuller explanation of the invention is given in the following description, based on the attached figures, in which.

DETAILED DESCRIPTION OF THE PREFERRED EMBODIMENTS

Figure 1:
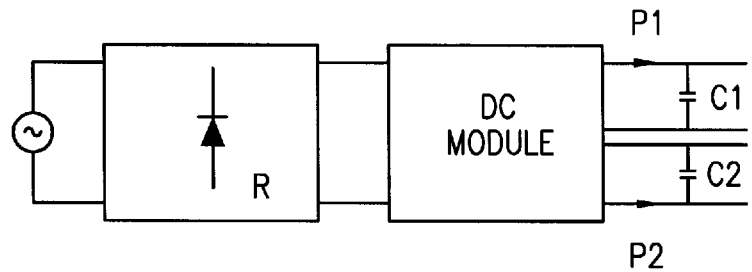
FIG. 1 shows, in block diagram form, the connection of a full-wave rectifier and an AC/DC converter device with two outputs according to the invention.

The AC/DC power converter device of the invention, see FIG. 1, is formed by a full-wave rectifier R that is connected to the AC mains supply and produces a rectified sine wave which is the input voltage for a direct current module with two outputs, the main output and the auxiliary output, these outputs feeding the same load V0.

Figure 3:
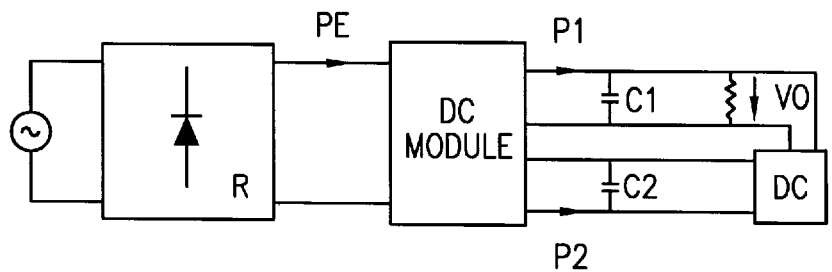
FIG. 3 shows a block diagram of a first preferred implementation of the AC/DC converter device according to the invention.
Figure 4:
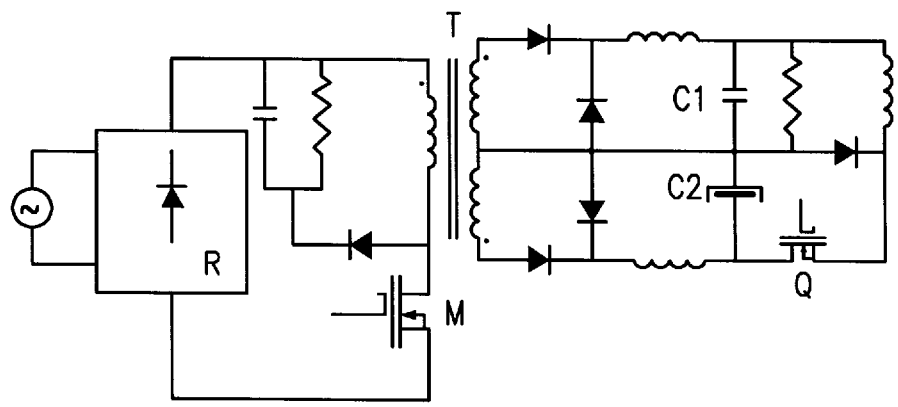
FIG. 4 shows the electrical schematic of the preferred implementation of the AC/DC converter device according to the invention.

The direct current module, as shown for example in detail in FIGS. 3 and 4, includes a transformer T, with a primary winding connected in series with a switching element M, and with a secondary winding which provides the two outputs of the module. This switching element M is driven by a switching control mechanism in such a manner that the input current follows the waveform of the input voltage, typically a sinusoid, and, as a result, permits it to correct the power factor so that this is kept close to unity.

Figure 2:
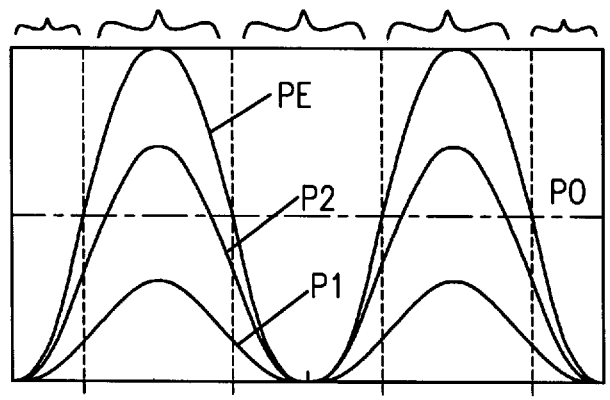
FIG. 2 shows the power waveforms associated with the AC/DC converter device according to the invention.

Likewise the input power PE is a squared sine wave and the power at each output, P1 and P2, retains the waveform of the input power PE; see FIG. 2.

On the other hand, the turns ratio of the transformer T determines the division of power between the outputs of the direct current module nevertheless, the average value of the total output power P0 of the AC/DC power converter device is the average value of the input power PE to the direct current module.

As a consequence, the power transferred through each output is different, the first power P1, transferred through the main output, always being less than the average value of the output power P0.

The main output transfers the first power P1 directly to the load V0 while the auxiliary output stores part of the input power PE, the second power P2, in a capacitor C2 which is connected to the load V0 via a direct current converter DC.

The power stored in this way is transferred to the load V0 to top up the first power P1 transferred through the main output, producing a DC output power. This occurs during the full cycle of the input power wave PE; in other words the auxiliary output delivers the second power P2 to the output during both the periods when the input power PE is greater than and when it is less than the average value of the output power P0.

A preferred implementation of the AC/DC power converter device comprises a full-wave rectifier R connected to a forward converter with two outputs, the main output incorporating an LC filter.

The auxiliary output includes a capacitor C2 which is connected to the load V0 through a buck converter; see FIGS. 3 and 4.

Figure 5:
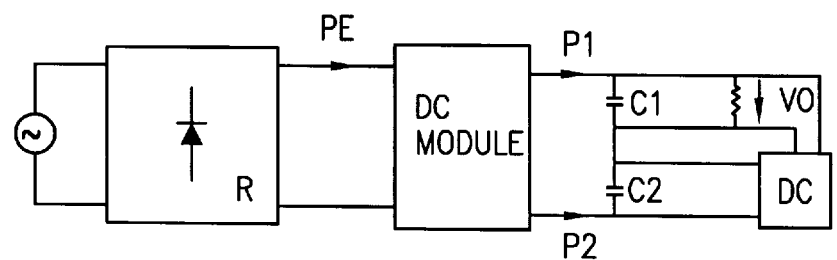
FIG. 5 shows a block diagram of a second preferred implementation of the AC/DC converter device according to the invention.
Figure 6:
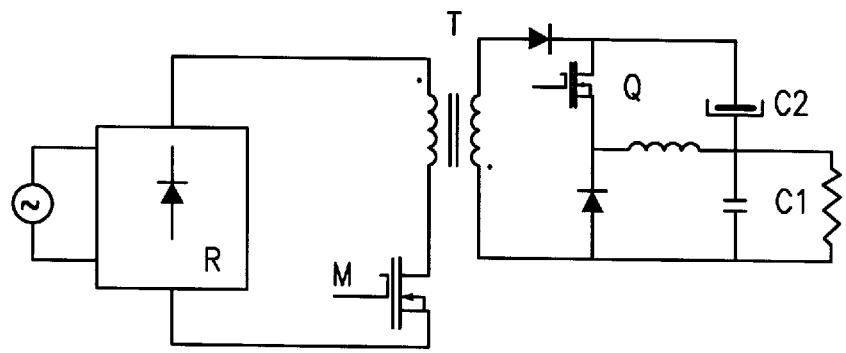
FIG. 6 shows the electrical schematic of the second preferred implementation of the AC/DC converter device according to the invention.

Another implementation of the converter device of the invention, as shown in FIGS. 5 and 6, comprises a full-wave rectifier bridge R connected to an isolated flyback converter with two outputs in such a way that the main output is connected to the load through a capacitor C1.

The auxiliary output comprises a capacitor C2 connected to the load through a buck-boost converter. Consequently the capacitor C1 of the main output and the capacitor C2 of the auxiliary output are connected in series. Thus, when the main output transfers the first power P1 to the load, the current flows through the two capacitors C1 and C2, which at that moment form a capacitive divider.

In both implementations the switching control mechanism of the switching element M in the primary of the direct current module is simple because the switching is done so that the input current follows the waveform of the input voltage to the module.

In addition, the topologies employed in implementing the direct current converter DC of the preferred implementations, may include a switching element Q which is switched in such a way that the converter DC is continuously topping up the first power P1 of the main output.

Also, the implementations used in developing the direct current module and the direct current converter DC are simple, all of which results in a smaller size and lower cost of the AC/DC power converter device.

In the described implementations of the AC/DC power converter device, good output voltage regulation is achieved, as well as a good dynamic response.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. AC/DC power converter device comprising a full-wave rectifier (R), responsive at an input thereof to an AC mains supply, for providing at an output thereof a rectified sine wave having an input power waveform (PE);

a direct current module (AC) responsive to said rectified sine wave, for providing output power divided into two outputs, a main output and an auxiliary output, wherein the main output is for connection to a load through a capacitor (C1) for directly transferring a first power (P1) to the load and wherein the auxiliary output is formed by a capacitor (C2) for storing a second power (P2) characterized by direct current conversion means (DC) for transferring the second power (P2) stored in the capacitor (C2) of the auxiliary output to the load during both a period when said input power waveform (PE) is greater than and a period when it is less than an average value (P0) of said output power.

* * * * *

UNITED STATES PATENT AND TRADEMARK OFFICE
CERTIFICATE OF CORRECTION

PATENT NO. : 5,867,378
DATED : February 2, 1999
INVENTOR(S) : O. Garcia Suarez et al It is certified that error appears in the above-identified patent and that said Letters Patent is hereby corrected as shown below:

On the title page, [19], line 2, please cancel "Suarez et al" and substitute --Garcia Suarez et al--.

At col. 4, line 44, please cancel "(AC)"

at line 48, please insert --first-- prior to "capacitor"

at line 50, please insert --second-- prior to "capacitor"

at line 53, please insert --second-- prior to "capacitor"

Signed and Sealed this

Twenty-ninth Day of June, 1999

Q. TODD DICKINSON

Attest:

Attesting Officer     Acting Commissioner of Patents and Trademarks